(12) United States Patent
Sawada et al.

(10) Patent No.: US 9,561,745 B2
(45) Date of Patent: Feb. 7, 2017

(54) CUP HOLDER

(71) Applicant: TOYODA GOSEI CO., LTD., Kiyosu-shi, Aichi-ken (JP)

(72) Inventors: Shinichi Sawada, Kiyosu (JP); Nobuhiko Yokota, Kiyosu (JP); Tomoyuki Nakayama, Kiyosu (JP); Kunihito Kondo, Nisshin (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/618,005

(22) Filed: Feb. 10, 2015

(65) Prior Publication Data
US 2015/0251582 A1    Sep. 10, 2015

(30) Foreign Application Priority Data

Mar. 4, 2014   (JP) .................. 2014-041094

(51) Int. Cl.
*B65D 6/40*   (2006.01)
*B60N 3/10*   (2006.01)

(52) U.S. Cl.
CPC ............... *B60N 3/10* (2013.01); *B60N 3/101* (2013.01); *B60N 3/106* (2013.01)

(58) Field of Classification Search
CPC ........ B60N 3/102; B60N 3/106; B60N 3/108; B60N 3/10
See application file for complete search history.

(56) References Cited

U.S. PATENT DOCUMENTS

| | | | | |
|---|---|---|---|---|
| 5,839,711 A * | 11/1998 | Bieck | ..................... | B60N 3/106 248/311.2 |
| 7,380,762 B2 * | 6/2008 | Takeichi | ................ | B60N 3/106 248/309.1 |
| 7,789,265 B2 * | 9/2010 | Kearney | ................ | B60N 3/106 220/737 |
| 7,866,620 B2 | 1/2011 | Kaemmer | | |
| 8,113,477 B2 * | 2/2012 | Kaemmer | .............. | B60N 3/106 224/926 |
| 8,783,635 B2 * | 7/2014 | Kamiya | ................. | B60N 3/101 224/282 |

(Continued)

FOREIGN PATENT DOCUMENTS

| | | |
|---|---|---|
| CN | 1709746 A | 12/2005 |
| CN | 102862503 A | 1/2013 |

(Continued)

*Primary Examiner* — Shawn M Braden
(74) *Attorney, Agent, or Firm* — Posz Law Group, PLC

(57) ABSTRACT

There is provided a cup holder including a holder body, an opening formed in a side wall of the holder body, a support supported on the side wall so as to advance into or retreat from a storage space through the opening, and a leaf spring disposed between the support and the side wall and biasing the support in a direction in which the support advances into the storage space. The support has a turning shaft serving as a center of swinging of the support and a swinging portion swinging around the turning shaft by turning of the turning shaft. On a peripheral edge of the opening formed in the side wall, a nipped portion protrudes to the outside of the side wall and swingably holds the support by being nipped between the turning shaft and the swinging portion while the support advances or retreats.

10 Claims, 11 Drawing Sheets

(56) References Cited

U.S. PATENT DOCUMENTS

| | | | |
|---|---|---|---|
| 8,807,504 B2 * | 8/2014 | Ogawa | B60N 3/106 |
| | | | 220/737 |
| 2004/0108428 A1 | 6/2004 | Leopold | |
| 2005/0279752 A1 | 12/2005 | Harada | |
| 2010/0200720 A1 | 8/2010 | Kaemmer | |
| 2010/0213227 A1 | 8/2010 | Kodama et al. | |
| 2013/0008932 A1 | 1/2013 | Shindo | |
| 2013/0256351 A1 | 10/2013 | Kodama et al. | |

FOREIGN PATENT DOCUMENTS

| | | |
|---|---|---|
| CN | 103358966 A | 10/2013 |
| JP | 2004-161124 A | 6/2004 |
| JP | 2004-182229 A | 7/2004 |
| JP | 2006-001479 A | 1/2006 |
| JP | 2009-101999 A | 5/2009 |
| JP | 2010-195186 A | 9/2010 |
| JP | 2012-046036 A | 3/2012 |

* cited by examiner

CUP HOLDER

BACKGROUND

1. Technical Field

The present invention relates to a cup holder disposed in the interior of a vehicle or the like and, more specifically, to a cup holder having a support that can hold a beverage container stored in a storage space.

2. Related Art

The interior of a vehicle is equipped with a cup holder to stably hold a beverage container. A large number of cup holders include supports to stably hold beverage containers having various sizes against acceleration or vibration of vehicles.

Such a support is normally biased to protrude into a storage space. As the support, for example, a biasing member is disposed between a holder body of the cup holder and the support to bias the support in a direction in which the support advances into the storage space. When a beverage container is stored in a storage space to push the support to the outside in a radial direction, the support retreats from the storage space to hold the side surface of the beverage container with biasing force of a biasing member (JP 2009-101999 A, JP 2012-046036 A, JP 2010-195186 A, JP 2006-001479 A, and JP 2004-182229 A).

SUMMARY

The present inventor has developed a cup holder, especially, a cup holder having a novel configuration having a support held in a holder body.

The present invention has been made in consideration of the above circumstances, and has as its object to provide a cup holder including a novel configuration having a support.

The present invention provides a cup holder including: a holder body having a cylindrical side wall surrounding a storage space; an opening formed in the side wall of the holder body; a support supported on the side wall such that the support can advance into or retreat from the storage space through the opening; and a biasing member disposed between the support and the side wall and biasing the support in a direction in which the support advances into the storage space, wherein the support has a turning shaft serving as a center of swinging of the support and a swinging portion disposed at a predetermined distance from the turning shaft and swinging around the turning shaft by turning of the turning shaft, the side wall of the holder body has, at positions facing each other through the opening, a rear wall protruding from the side wall to a rear side opposite to the storage space, and the rear wall has a nipped portion that swingably holds the support by being nipped between the turning shaft and the swinging portion while the support advances or retreats.

According to the configuration, the rear wall is disposed on the rear side of the side wall of the holder body, and comprises the nipped portion nipped between the turning shaft and the swinging portion of the support to hold the support such that the support can swing with respect to the holder body. For this reason, the support can be held such that the support can swing with respect to the holder body.

The biasing member swingably hold the support on the holder body while biasing the support in a direction in which the support moves into the storage space. For this reason, a holding configuration of the support is simple, and the support can be assembled in a small number of steps.

The nipped portion preferably has a bearing portion that turnably holds the turning shaft and a guide portion that guides swinging of the swinging portion. Since the support swings along the guide portion of the nipped portion, the support can stably swing. The nipped portion turnably holds the turning shaft of the support while guiding the swinging of the swinging portion. With the simple configuration, the support can be smoothly swung.

The nipped portion preferably has a holding surface that holds a portion facing the rear side of the turning shaft. When the support retreats, the turning shaft tends to move to the rear side. The nipped portion has a holding surface that holds the rear side of the turning shaft. For this reason, even though the support retreats, the turning shaft is held on the holding surface. There is no risk of causing the turning shaft to fall out of the bearing portion.

The nipped portion preferably has a turning shaft guiding portion that guides the turning shaft from the outside of the turning shaft in the radial direction. Through the turning shaft guiding portion, the turning shaft is guided from the outside in the radial direction to the bearing portion. On the other hand, when the bearing portion is a round hole, the turning shaft needs to be guided into the bearing portion in the direction of the shaft. In this case, the turning shaft and the nipped portion need to be slightly bent to push the turning shaft into the bearing portion, which causes poor workability. As in the present invention, the nipped portion has the turning shaft guiding portion that guides the turning shaft from the outside of the turning shaft in the radial direction to make it possible to easily guide the rotating shaft into the bearing portion without bending the turning shaft and the nipped portion so as to achieve good workability.

The nipped portion preferably has a swinging portion guiding portion that guides the swinging portion into the guide portion from the rear side. Through the swinging portion guiding portion, the swinging portion can be guided into the guide portion from the rear side. The support can be assembled in the holder body with good workability.

The biasing member is preferably configured by a cantilevered spring having a fixed end held on the side wall of the holder body and a free end disposed on the outside of the support. The cantilevered spring can be easily attached to the support and the holder body, and can bias the support toward the storage space.

The cantilevered spring is preferably configured by an arc-like spring and a leaf spring. Any cantilevered spring is configured to be easily attached to the holder body and the support.

The rear wall preferably has a base portion having a protruding portion on the upper side of the nipped portion, and the support preferably has an arc-like groove in which the protruding portion is movably fitted. The support can stably advance into or retreat from the storage space along the arc-like groove.

The rear wall preferably has only the nipped portion. For this reason, the support and the biasing member can be easily assembled from a side of the cup holder, and the number of steps of assembling parts can be considerably reduced.

According to the cup holder of the present invention, the nipped portion protruding to the outside of the side wall of the holder body is nipped by the turning shaft and the swinging portion of the support to hold the support such that the support can swing with respect to the holder body. For this reason, a novel support holding configuration can be provided.

DESCRIPTION OF EMBODIMENTS

First Embodiment

Figure 1:
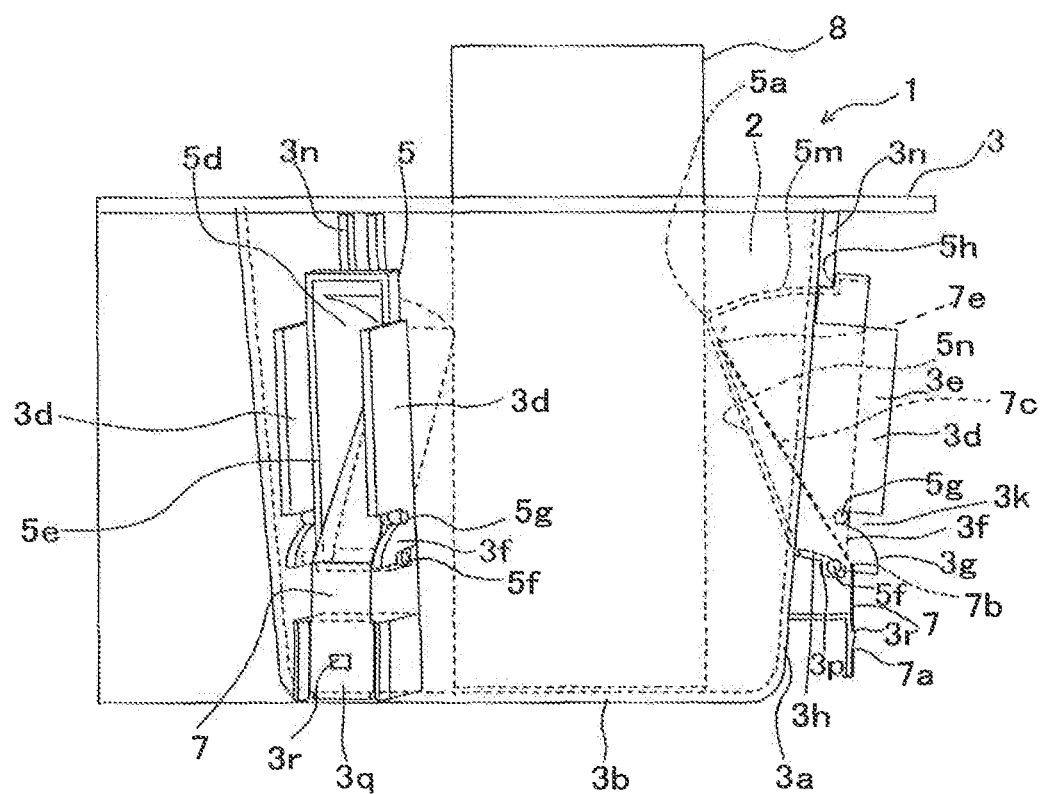
FIG. 1 is a front view of a cup holder according to a first embodiment of the present invention.
Figure 2:
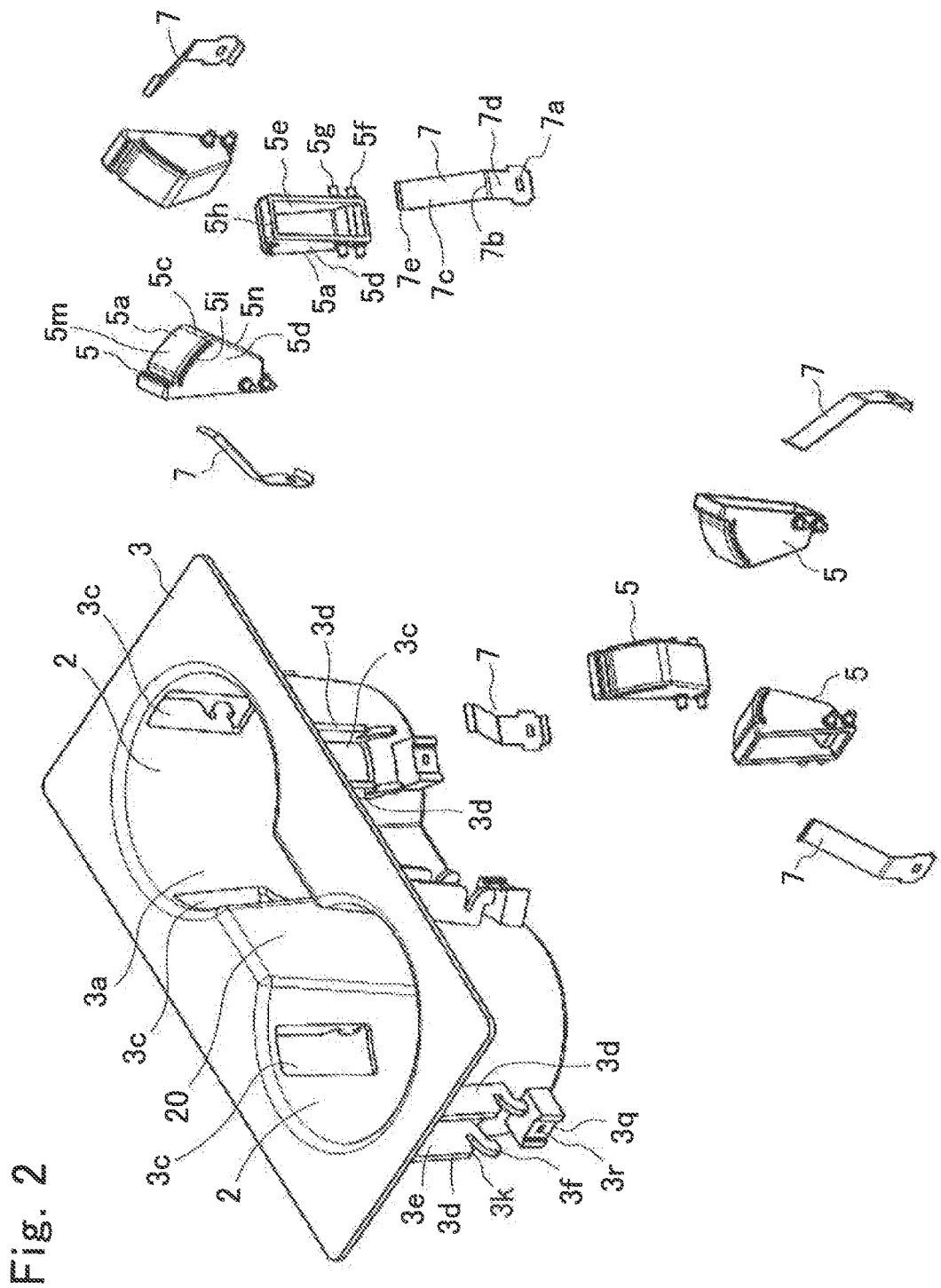
FIG. 2 is an exploded perspective view of the cup holder according to the first embodiment.

A cup holder 1 according to the first embodiment of the present invention, as shown in FIGS. 1 and 2, includes a bottomed-cylindrical holder body 3 in which two storage spaces 2 for storing a beverage container 8, a support 5 that advances into or retreats from the storage spaces 2, and a leaf spring 7 (biasing member) biasing the support 5 in a direction in which the support 5 advances into the storage spaces 2.

The holder body 3 is made of a resin and formed by injection molding. The holder body 3 has a bottomed-cylindrical shape. The holder body 3 has a cylindrical side wall 3a and a bottom wall 3b which closes the lower end of the side wall 3a. A space surrounded by the side wall 3a and the bottom wall 3b is the storage space 2 for storing the beverage container 8. The beverage container 8 is inserted from above the storage spaces 2. The two storage spaces 2 have recessed parts which communicate with each other through a recessed portion 20.

Figure 3:
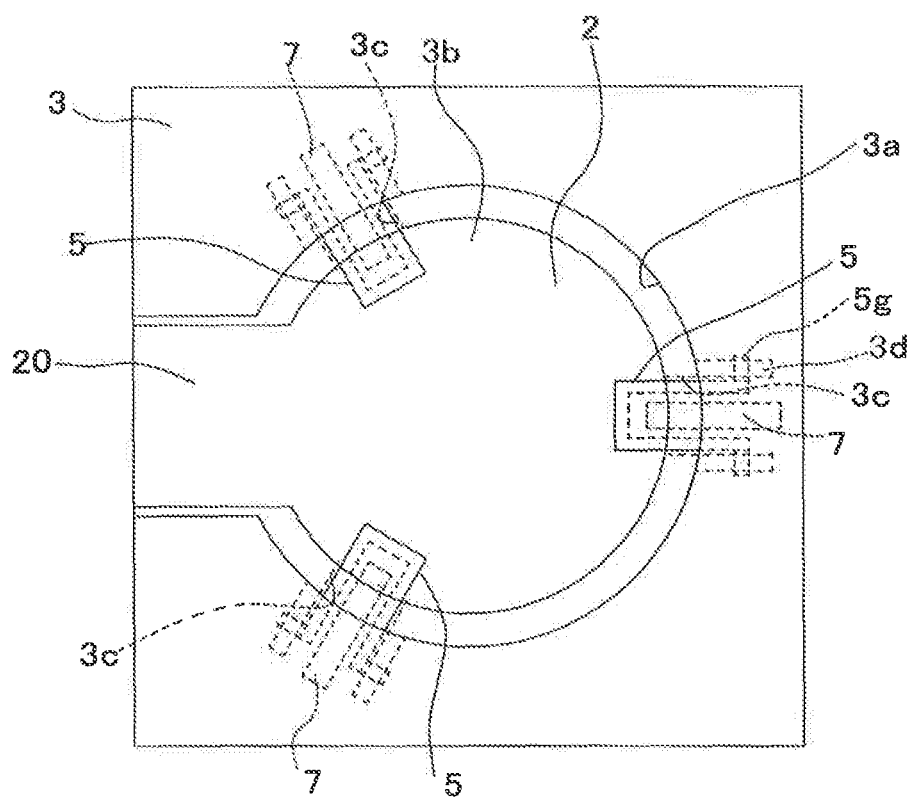
FIG. 3 is a plan view of the cup holder according to the first embodiment.

An inner diameter of the side wall 3a is slightly larger than the outer diameter of the beverage container 8 having a maximum diameter which can be stored in the storage space 2, and the inner diameter of the side wall 3a gradually decreases from the upper side to the lower side of the storage space 2. As shown in FIG. 3, in an upper part of the side wall 3a, three openings 3c are formed at equal intervals to surround the beverage container stored in the storage space 2 in the circumferential direction. In each of the openings 3c, a contact projecting portion 5a (to be described later) of the support 5 is disposed.

As shown in FIGS. 1 and 2, the contact projecting portion 5a of the support 5 is a portion that holds the side surface of the beverage container 8 and has a shape expanding to the advancing side. The projecting portion 5a is inserted into the opening 3c of the holder body 3 from the outside of the holder body 3. The contact projecting portion 5a has an apex 5c disposed to maximally project to the storage space 2 side and inclined surfaces 5m and 5n retreated toward the upper and lower ends of the apex 5c in the vertical direction. The upper inclined surface 5m has a moderately arc-like shape, and the lower inclined surface 5n linearly inclined downward from the apex 5c in a retreating direction.

When the support 5 is located at an advanced reference position at which the support 5 maximally advances into the storage space 2, an interval between the apexes 5c of the contact projecting portions 5a facing each other through the storage space 2 is slightly larger than the outer diameter of a beverage container having a minimum diameter which can be stored in the storage space 2. Side surfaces 5d facing each other are disposed on both sides of the contact projecting portion 5a in a direction of width. Each of the side surfaces 5d has an opening edge 5e linearly extending between the upper end and the lower end of the support 5.

As shown in FIG. 2, the support 5 further includes a turning shaft 5f and a swinging portion 5g which are disposed below the contact projecting portion 5a and a regulating portion 5h and an arc-like groove 5i which are disposed above the contact projecting portion 5a.

The turning shaft 5f projects from the lower end of the opening edge 5e on each of the side surfaces 5d of the support 5 toward the outside in the direction of width. The swinging portion 5g is located on the lower side of the opening edge 5e on each of the side surfaces 5d of the support 5 and the upper side of the turning shaft 5f. The swinging portion 5g is a rod-like shape and extends in parallel with the turning shaft 5f.

Figure 4:
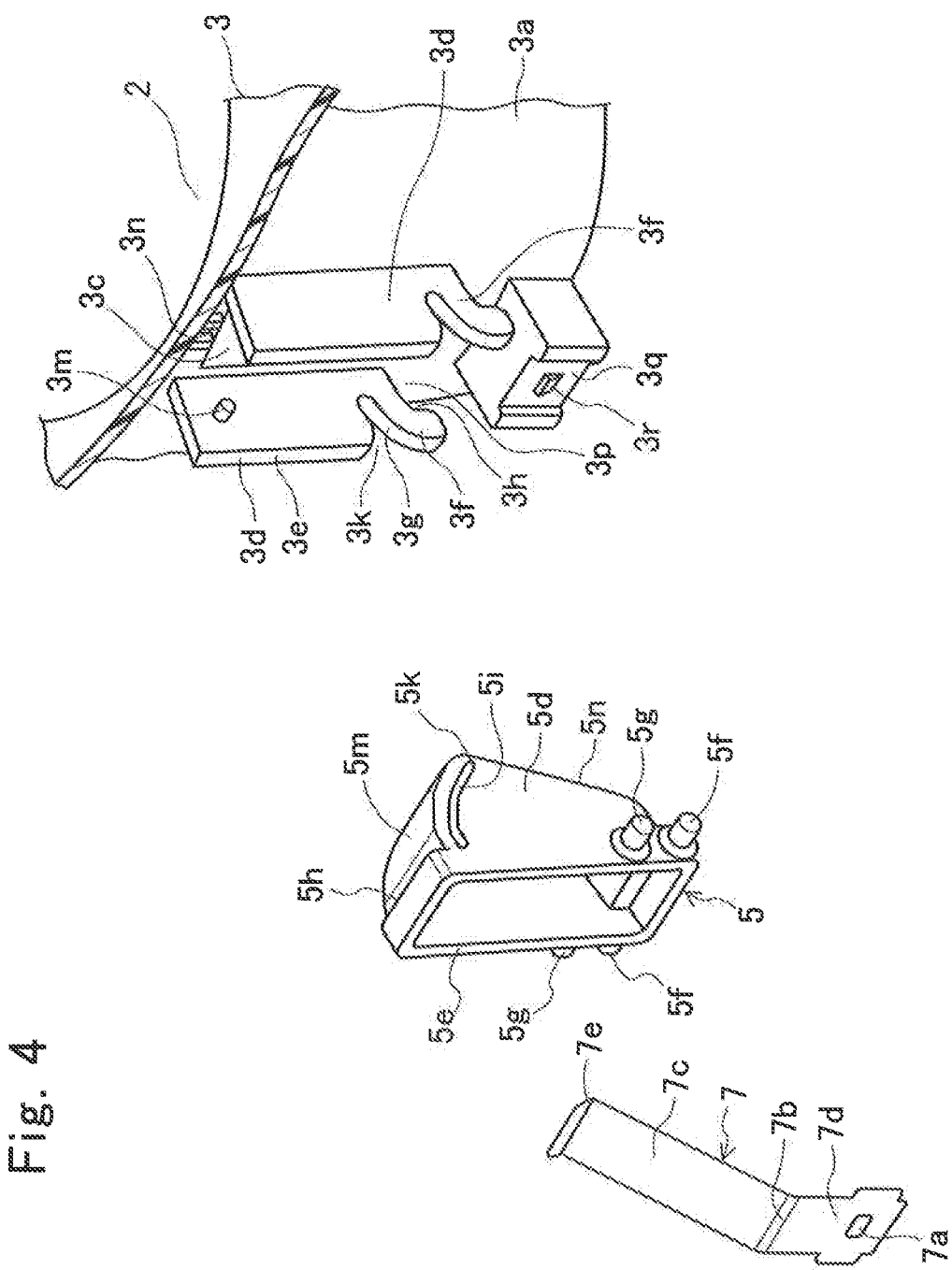
FIG. 4 is an exploded perspective view of a support and a leaf spring around an opening of the holder body in the first embodiment.

As shown in FIG. 4, the regulating portion 5h is disposed on the upper end of the opening edge 5e on each of the side surfaces 5d of the support 5, and is brought into contact with a contact portion 3n formed on the upper edge of the opening 3c of the holder body 3 when the support 5 is located at the maximally advancing position so as to regulate further advancing of the support 5 into the storage space 2. The arc-like groove 5i is movably fitted on protruding portions 3m formed on the insides of one pair of rear walls 3d, respectively. The protruding portions 3m move along the arc-like groove 5i to a position to which the support 5 advances into the storage space 2 or retreats therefrom. When the protruding portion 3m is located at a front-side end 5k of the arc-like groove 5i, the support 5 is located to a maximally retreating position to regulate further retreating of the support 5.

Three supports 5 are disposed at equal intervals to surround a beverage container stored in the storage space 2 from a circumferential direction, and each support 5 is disposed in the openings 3c of the holder body 3 to face the storage space 2. The supports 5 are made of a resin, and are integrally molded by injection molding.

On the peripheral edges of the openings 3c of the side wall 3a of the holder body 3, one pair of rear walls 3d is protruded from the rear side of the side wall 3a on the opposite side of the storage space 2. The pair of rear walls 3d is disposed at positions facing each other through the opening 3c in the direction of width and vertically extends in parallel with each other. Each of the rear walls 3d has a base portion 3e disposed on the upper side of the rear wall 3d and a nipped portion 3f which is disposed below the rear wall 3d and nipped between the turning shaft 5f and the swinging portion 5g of the support.

At the lower end of the nipped portion 3f, a bearing portion 3h bearing the turning shaft 5f is formed. At the upper end of the nipped portion 3f, a guide portion 3g guiding the swinging portion 5g is formed.

Figure 5:
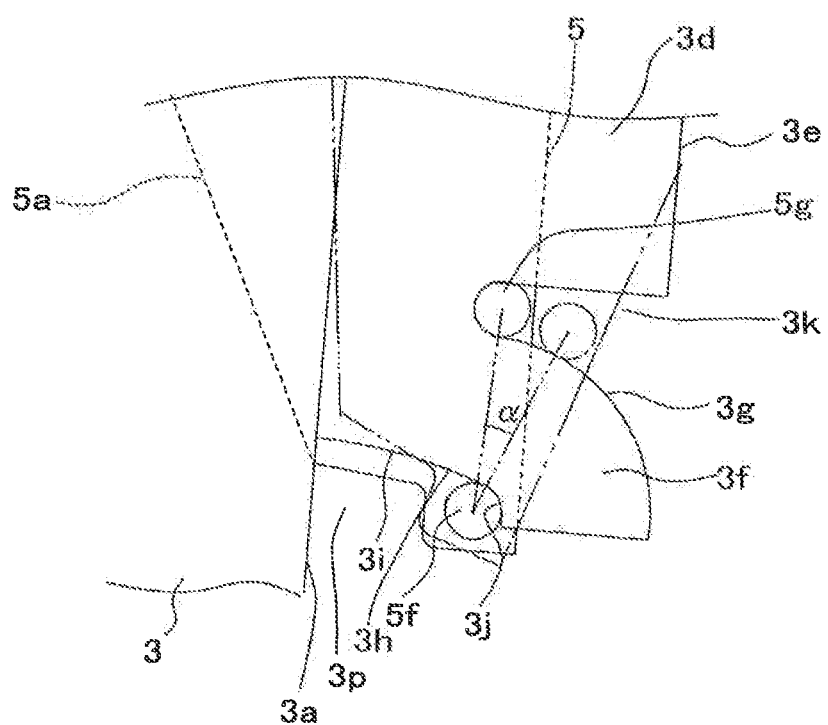
FIG. 5 is an enlarged front view of a main part of the cup holder according the first embodiment.

As shown in FIG. 5, the bearing portion 3h is formed at the lower end of the nipped portion 3f, and has a curved bearing surface 3i moderately narrowly curved from the side wall 3a of the holder body 3 to the outside in the radial direction and a holding surface 3j continuously curved from the curved bearing surface 3i and extending downward. The curved bearing surface 3i has a curvature gradually increasing toward the outside in the radial direction. An end point of the curved bearing surface 3i on the outside in the radial direction is in contact with a surface of the turning shaft 5f on the outside in the radial direction. The holding surface 3j continuously extends downward from the end point of the curved bearing surface 3i. The holding surface 3j is brought into contact with a surface of the turning shaft 5f which is a portion directed in the direction in which the support 5 retreats to hold the rear side of the turning shaft 5f. The holding surface 3j extends downward by several millimeters from the portion being in contact with the turning shaft 5f. Also when the turning shaft 5f receives a load to the outside in the radial direction, the turning shaft 5f is held by the holding surface 3j, and the turning shaft 5f is prevented from dropping off.

As shown in FIG. 5, on the upper side of the nipped portion 3f, the guide portion 3g that guides swinging of the swinging portion 5g with advance/retreat movement of the support 5 is formed. The guide portion 3g has an arc-like shape extending from a start point which is a portion immediately above the portion where the bearing portion 3h is disposed on the nipped portion 3f and draws a circle concentric with the bearing portion 3h from the start point.

Between the nipped portion 3f on the rear wall 3d and the base portion 3e, a swinging portion guiding portion 3k that guides the swinging portion 5g from the rear side to the guide portion 3g is disposed. The swinging portion guiding portion 3k opens to the outside in the radial direction, and the opening has a width which is gradually narrowed toward the back side, i.e., the inside in the radial direction. A vertical width of the swinging portion guiding portion 3k on the back side is slightly larger than the diameter of the swinging portion 5g.

As shown in FIG. 4, in order to hold the support 5 on the holder body 3, the contact projecting portion 5a of the support 5 is inserted from the rear side of the opening 3c of the side wall 3a of the holder body 3, the turning shaft 5f of the support 5 is guided from the outside of the turning shaft 5f in the radial direction to the bearing portion 3h through a turning shaft guiding portion 3p opening in the lower end of the nipped portion 3f. The swinging portion 5g of the support 5 is guided from swinging portion guiding portion 3k to the guide portion 3g. A distance between the bearing portion 3h and the guide portion 3g, i.e., the width of the nipped portion 3f is almost equal to a distance between the turning shaft 5f and the swinging portion 5g of the support 5. For this reason, the nipped portion 3f is nipped by the turning shaft 5f and the swinging portion 5g of the support 5 to swingably hold the support 5 on the holder body 3.

As shown in FIG. 4, the leaf spring 7 has a long plate-like shape. A lower base portion 7d of the leaf spring 7 serves as a fixed end of the leaf spring 7, and a square attaching hole 7a is formed in the base portion 7d. In the attaching hole 7a, a latch piece 3r of an attaching portion 3q protruded on the rear side of the side wall 3a of the holder body 3 is latched. At a nearly center of the leaf spring 7 in the longitudinal direction, a bent portion 7b is formed, and an inclined portion 7c above the bent portion 7b is inclined at a predetermined angle with respect to the base portion 7d below the bent portion 7b. A distal end 7e of the inclined portion 7c is a free end. The distal end 7e of the leaf spring 7 is brought into press contact with the rear-surface side of an inclined surface 5n below the projecting portion 5a of the support 5 to bias the support 5 in a direction in which the support 5 advances into the storage space 2.

Figure 6:
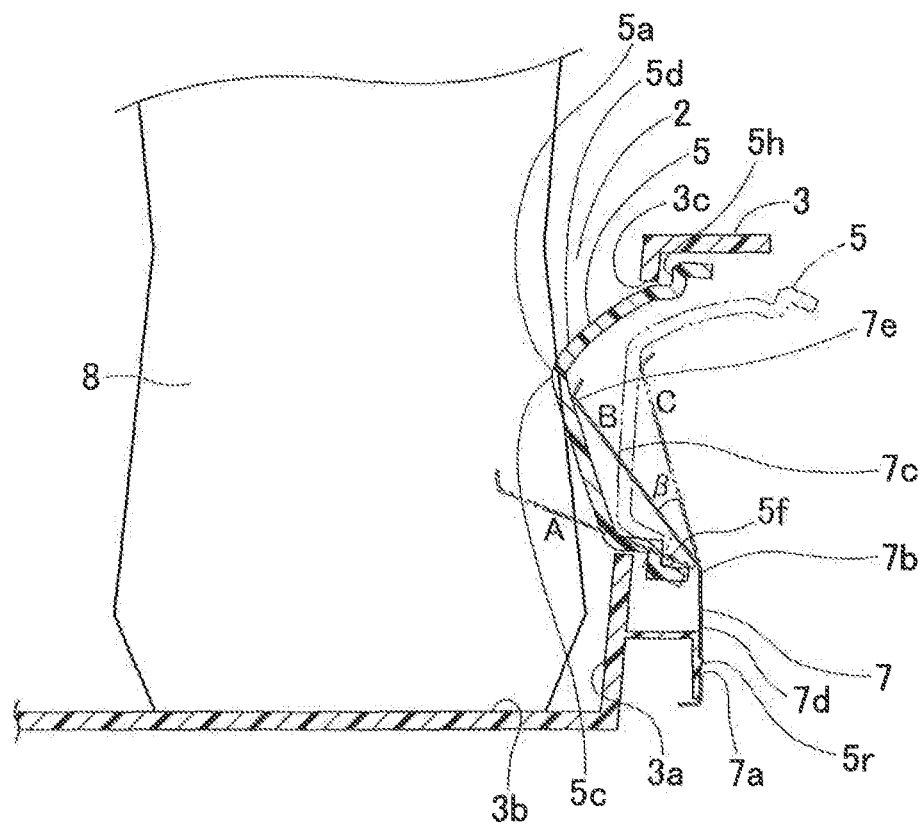
FIG. 6 is a sectional view of the cup holder according to the first embodiment.

Symbol A in FIG. 6 shows a state in which the leaf spring 7 is free, symbol B in FIG. 6 shows a state of the leaf spring 7 when the leaf spring 7 is attached to the holder body 3 and the support 5 and the support 5 is located at the maximally advancing position, and symbol C in FIG. 6 shows a state of the leaf spring 7 when the leaf spring 7 is attached to the holder body 3 and the support 5 and the support 5 is located at the maximally retreating position. When the leaf spring 7 is attached to the holder body 3 and the support 5, the leaf spring 7 is elastically deformed to the rear side with reference to the position in a free state to direct biasing force in an advancing direction. When a turning angle β of the leaf spring 7 while the support 5 moves from the maximally advancing position to the maximally retreating position is 19.5°, and a turning angle α of the turning shaft 5f serving as a center of rotation of the support 5 is also set to 19.5°.

The support 5 indicated by solid lines in FIGS. 5 and 6 shows a state in which the support 5 maximally advances to the storage space 2. With biasing force of the leaf spring 7, the support 5 always intends to advance toward the storage space 2. The regulating portion 5h which is the upper portion of the support 5 is brought into contact with the upper peripheral edge of the opening 3c of the holder body 3 to hold the support 5 at the maximally advancing position.

The support 5 indicated by chain double-dashed lines in FIGS. 5 and 6 shows a state in which the support 5 maximally retreats from the storage space 2. When the beverage container 8 is stored in the storage space 2, the support 5 retreats by being pressed against the side surface of the beverage container 8. A state in which the apex 5c of the projecting portion 5a of the support 5 is located on the same plane as that of the side wall 3a of the holder body 3 is set as the state in which the support 5 is located at the maximally retreating position. At this time, the upper end of the support 5 retreats toward the rear side with respect to the opening 3c of the holder body 3, and the protruding portions 3m formed on the rear wall 3d of the holder body 3 is brought into contact with the front-side end 5k of the arc-like groove 5i (FIG. 4) to hold the support 5 at the maximally retreating position. While the support 5 swings from the maximally advancing position to the maximally retreating position, the swinging portion 5g of the support 5 moves along an arc-like shape while being guided by the guide portion 3g of the nipped portion 3f and stops at a terminal position which is swung by 19.5° from the back portion of the guide portion 3g. A distance between the guide portion 3g and the bearing portion 3h of the nipped portion 3f is held constant between the back portion of the guide portion 3g and the terminal position. A distance between the guide portion 3g and the bearing portion 3h is equal to a distance between the turning shaft 5f and the swinging portion 5g of the support 5. For this reason, the nipped portions 3f having the bearing portion 3h and the guide portion 3g disposed on both the sides stably holds the support 5 while the support 5 moves between the maximally advancing position and the maximally retreating position.

The nipped portion 3f protruding to the outside of the side wall of the holder body 3 is nipped by the turning shaft 5f and the swinging portion 5g of the support 5 to swingably hold the support 5 on the holder body 3. For this reason, the support 5 can be held such that the support 5 can swing with respect to the holder body 3.

Since the support 5 swings along the guide portion 3g of the nipped portion 3f, the support 5 can stably swing.

While the support 5 and the leaf spring 7 biases the support 5 in a direction in which the support advances into the storage space, the support 5 is swingably held on the holder body 3. For this reason, a holding configuration of the support 5 is simple, and the support 5 can be assembled in a small number of steps.

At the lower end of the nipped portion 3f, the turning shaft guiding portion 3p that guides the turning shaft 5f from the outside in the radial direction to the bearing portion 3h is disposed. Above the nipped portion 3f, the swinging portion guiding portion 3k to guide the swinging portion 5g from the rear side to the guide portion 3g is disposed. The turning shaft 5f is guided to the bearing portion 3h through the turning shaft guiding portion 3p, and, furthermore, the swinging portion 5g is guided to the guide portion 3g through the swinging portion guiding portion 3k formed outside the support 5. For this reason, the support 5 can be easily assembled in the holder body 3. Furthermore, the turning shaft guiding portion 3p opens on the lower side of the nipped portion 3f, and the swinging portion guiding portion 3k opens the outside in the radial direction of the nipped portion 3f. For this reason, when the swinging portion 5g is guided to the guide portion 3g from the outside in the radial direction through the swinging portion guiding portion 3k while the turning shaft 5f is inserted from the lower side of the nipped portion 3f, the support 5 can be assembled in the holder body 3. The support 5 can be supported on the rear wall 3d without bending the turning shaft 5f, the swinging portion 5g, or the rear wall 3d.

The leaf spring 7 is a cantilevered spring. The cantilevered spring is easily attached to the support 5 and the holder body 3, and can bias the support 5 toward the storage space 2.

Second Embodiment

Figure 7:
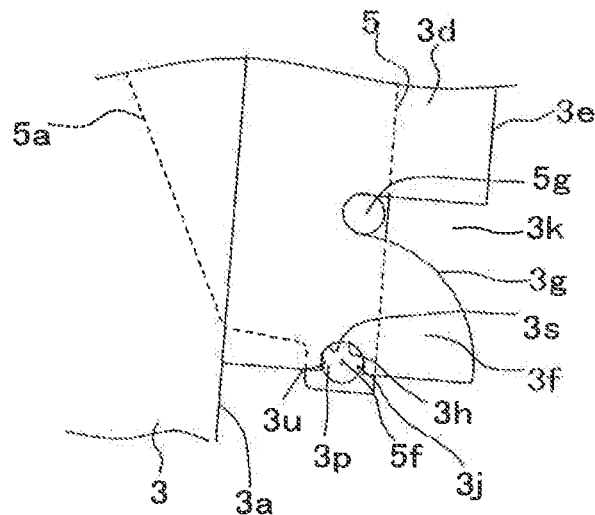
FIG. 7 is an enlarged front view of a main part of a cup holder according to a second embodiment.

In a cup holder according to a second embodiment, as shown in FIG. 7, the bearing portion 3h formed at the nipped portion 3f of the holder body 3 has an arc-like bearing surface 3s having an arc-like shape having a size almost equal to an outside dimension of the turning shaft 5f, the holding surface 3j holding a surface of the turning shaft 5f on the retreating side, and a contact surface 3u brought into contact with a surface of the turning shaft 5f on the advancing side. The rear side of the arc-like bearing surface 3s is continuously connected to the holding surface 3j, and the advancing side thereof is continuously connected to the contact surface 3u. The holding surface 3j and the contact surface 3u extend downward by several millimeters from the portion being in contact with the turning shaft 5f. Between the lower end of the holding surface 3j and the lower end of the contact surface 3u, the bearing portion guiding portion 3p guiding the turning shaft 5f to the bearing portion 3h is opened.

In the second embodiment, not only the surface on the upper side of the turning shaft 5f and the surface on the retreating side thereof, but also the surface on the advancing side thereof are held by the arc-like bearing surface 3s, the holding surface 3j, and the contact surface 3u of the nipped portion 3f. For this reason, the turning shaft 5f can be stably held on the bearing portion 3h.

Third Embodiment

Figure 8:
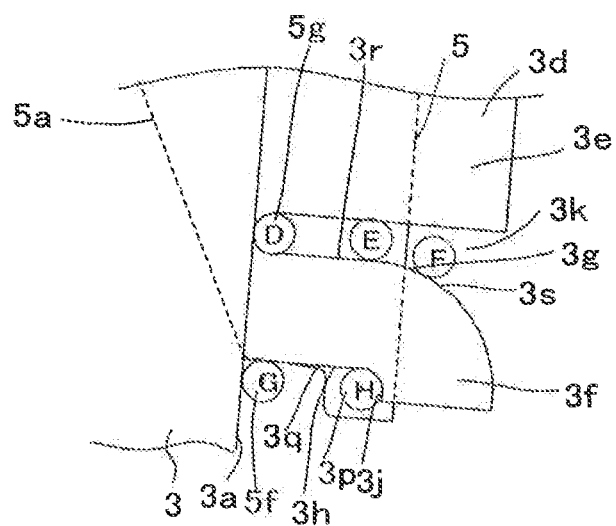
FIG. 8 is an enlarged front view of a main part of a cup holder in a third embodiment.

In a cap holder according to a third embodiment, as shown in FIG. 8, the bearing portion 3h formed on the lower side of the nipped portion 3f of the holder body 3 has a linear bearing surface 3q extending from the side wall 3a to the rear side and the holding surface 3j bent from the rear side of the linear bearing surface 3q and extending downward in the vertical direction. The guide portion 3g formed on the upper side of the nipped portion 3f has a linear guide surface 3r extending from the side wall 3a to the rear side and an arc-like guide surface 3s curved in an arc-like shape from the rear side of the linear guide surface 3r. The linear guide surface 3r of the guide portion 3g is formed in parallel with the linear bearing surface 3q of the bearing portion 3h. A start point of the linear guide surface 3r of the guide portion 3g is located on the side wall 3a, and an end point of the linear guide surface 3r is continuously connected to the start point of the arc-like guide surface 3s. A distance between the bearing portion 3h and the guide portion 3g is held constant at any position between the linear guide surface 3r and the arc-like guide surface 3s. The distance is equal to a distance between the turning shaft 5f and the swinging portion 5g of the support 5.

When the support 5 is located at the maximally advancing position, the turning shaft 5f, as indicated by symbol G in FIG. 8, is located at the start point of the linear bearing surface 3q of the bearing portion 3h, and the swinging portion 5g is located at the start point of the linear guide surface 3r of the guide portion 3g as indicated by symbol D in FIG. 8. When the support 5 is pressed to the retreating side by the beverage container 8, the turning shaft 5f moves along the linear bearing surface 3q of the bearing portion 3h to the outside in the radial direction, and the turning shaft 5f, as indicated by symbol H in FIG. 8, finally reaches the holding surface 3j. Accordingly, the swinging portion 5g, as indicated by symbol E in FIG. 8, moves along the linear guide surface 3r of the guide portion 3g to the outside in the radial direction. Furthermore, when the support 5 is pressed on the rear side, the swinging portion 5g swings to the rear side around the turning shaft 5f and reaches the arc-like guide surface 3s as indicated by symbol F in FIG. 8. When the support 5 is located at the maximally retreating position, the turning shaft 5f is brought into contact with the holding surface 3j of the bearing portion 3h. The swinging portion 5g stops at a position which is swung by 19.5° around the turning shaft 5f from the start point of the arc-like guide surface 3s of the guide portion 3g.

In the third embodiment, although the swinging portion 5g moves along a straight line and an arc-like shape, the swinging portion 5g may be configured to advance retreat along the straight line.

Fourth Embodiment

Figure 9:
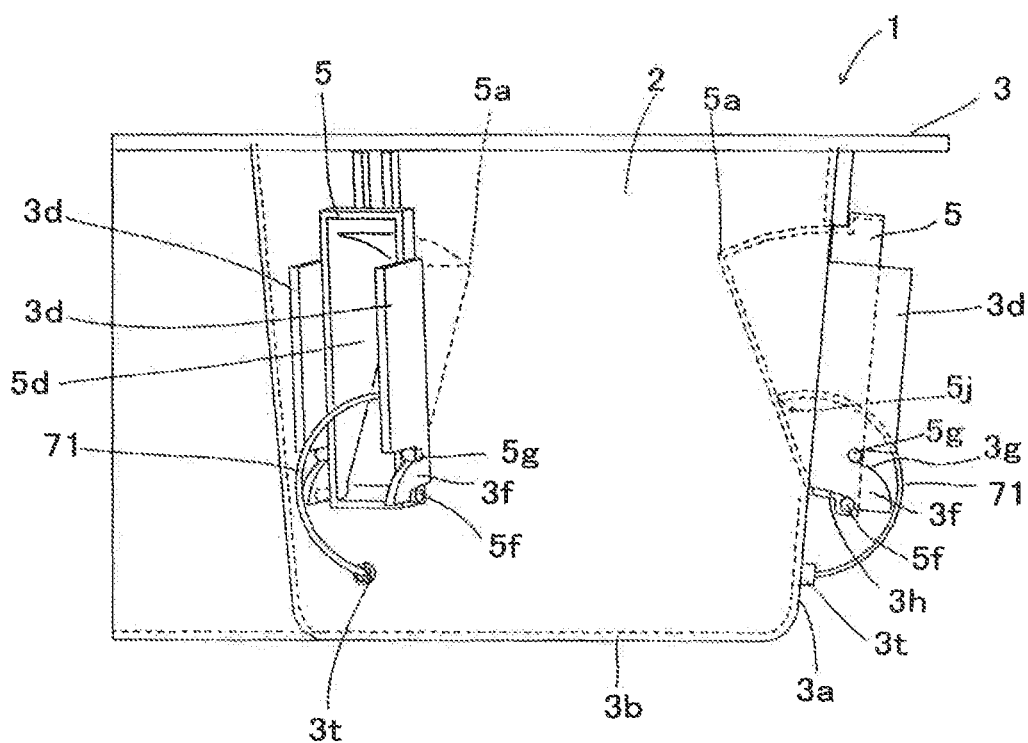
FIG. 9 is a front view of a cup holder according to a fourth embodiment.
Figure 10:
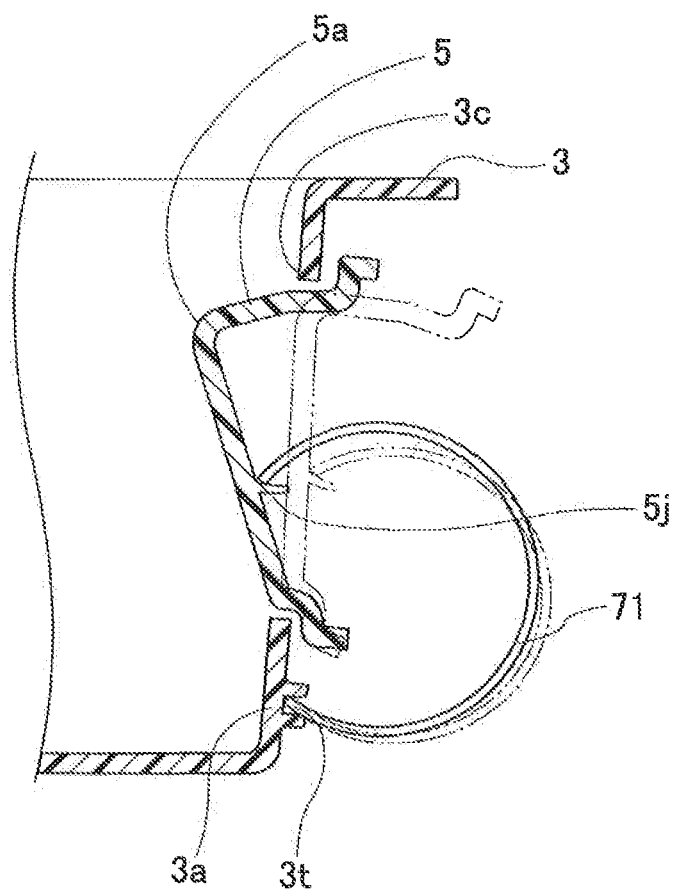
FIG. 10 is a sectional view of the cup holder according to the fourth embodiment.

A cup holder according to a fourth embodiment, as shown in FIGS. 9 and 10, is different from the cup holder according to the first embodiment in that an arc-like spring 71 (biasing member) is used in place of a leaf spring. The arc-like spring 71 has an arc-like shape. One end of the arc-like spring 71 is a fixed end which is fixed to a recessed portion 3t formed in the side wall 3a of the holder body 3. The other end of the arc-like spring 71 is a free end which is brought into contact with a latch claw 5j protruding from the rear surface of the support 5.

The support 5 indicated by a solid line in FIG. 10 is located at the maximally advancing position, and the support 5 indicated by a chain double-dashed line in FIG. 10 is located at the maximally retreating position. The arc-like spring 71 is attached to the support 5, and, after the support 5 is located at the maximally advancing position, the support 5 is biased in an advancing direction until the support 5 is located at the maximally retreating position.

Fifth Embodiment

Figure 11:
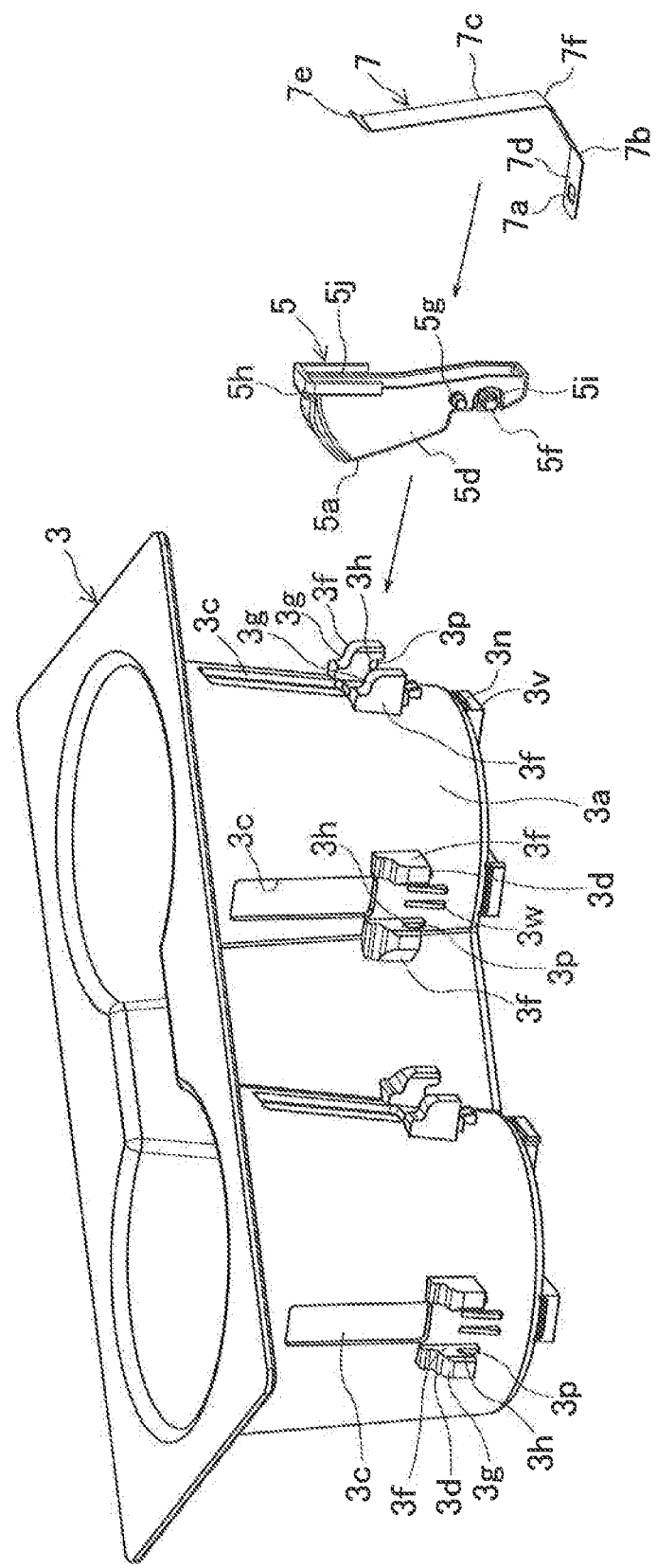
FIG. 11 is an exploded perspective view of a cup holder according to a fifth embodiment.
Figure 12:
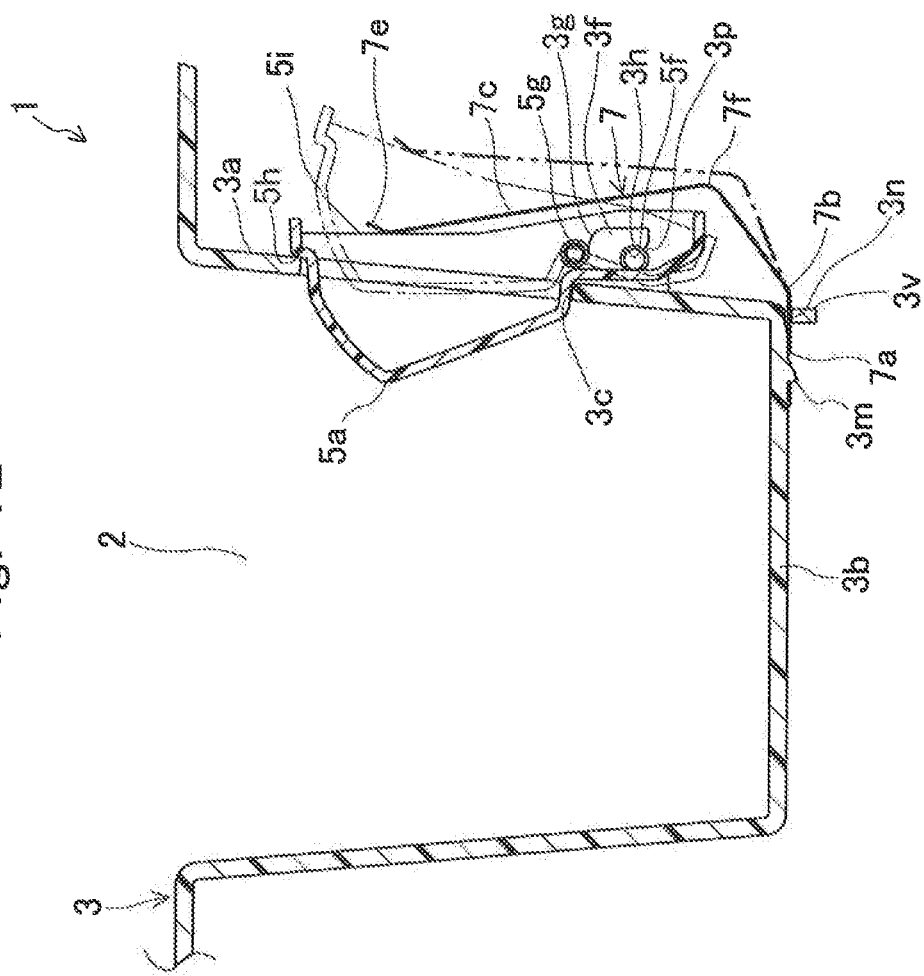
FIG. 12 is a sectional view of the cup holder according to the fifth embodiment.

A cup holder according to a fifth embodiment, as shown in FIGS. 11 and 12, is different from the cup holder according to the first embodiment in that base portions 3e are not disposed on one pair of rear walls 3d of the holder body 3.

In the fifth embodiment, each of one pair of rear walls 3d has only the nipped portion 3f. Lower ends on the facing surface sides of the nipped portions 3f have the bearing portion 3h recessed in an arc-like shape corresponding to the turning shaft 5f of the support 5 and the turning shaft guiding portion 3p extending to the lower side of the bearing portion 3h. The bearing portion 3h turnably holds the turning shaft 5f of the support 5.

On the upper side of the nipped portion 3f, the guide portion 3g that guides swinging of the swinging portion 5g is formed. The guide portion 3g has an arc-like shape extending from a start point which is a portion immediately above the bearing portion 3h of the nipped portion 3f and draws a circle concentric with the bearing portion 3h from the start point.

The turning shaft 5f and the swinging portion 5g are formed to protrude from the pair of side surfaces 5d of the support 5. In the peripheral edges of the turning shafts 5f on the side surfaces 5d, grooves 5j are formed to reduce sliding friction between the support 5 and the nipped portion 3f when the support 5 swings.

The leaf spring 7 is a long plate-like shape, and has two bent portions 7b and 7f formed in the longitudinal direction. The two bent portions 7b and 7f incline the inclined portion 7c on the upper side of the lower base portion 7d of the leaf spring 7 at a predetermined angle. In the lower base portion 7d of the leaf spring 7, an attaching hole 7a is formed.

On the lower peripheral edge of the opening 3c of the side wall 3a of the holder body 3, a rib-like contact portion 3w brought into contact with the lower portion of the support 5 is disposed.

As shown in FIG. 12, on the peripheral edge of the bottom wall 3b of the holder body 3, a holding wall 3v is formed at just a portion located immediately below the opening 3c. At a portion on the inside in the radical direction with respect to the holding wall 3v on the bottom wall 3b, a latch claw 3m is disposed. The lower base portion 7d of the leaf spring 7 is inserted into a slit 3n formed in the holding wall 3v. The attaching hole 7a is latched on the latch claw 3m to support the leaf spring 7 on the bottom wall 3b of the holder body 3.

The distal end 7e of the inclined portion 7c on the upper side of the leaf spring 7 is a free end. The distal end 7e of the leaf spring 7 is brought into contact with a rear-end surface 5j of the side surface 5d of the support 5 to bias the support 5 in a direction in which the support 5 advances into the storage space 2. The regulating portion 5h disposed on the upper side of the support 5 is brought into contact with the upper peripheral edge of the opening 3c of the holder body 3 to hold the support 5 at the maximally advancing position. When the beverage container is inserted into the storage space 2, the beverage container is brought into contact with the contact projecting portion 5a of the support 5, and, as indicated by a chain double-dashed line in FIG. 12, the support 5 retreats from the storage space 2.

As shown in FIGS. 11 and 12, the turning shaft 5f of the support 5 is guided to the bearing portion 3h to hold the swinging portion 5g of the support 5 on the guide portion 3g, so that the nipped portion 3f is nipped by the turning shaft 5f and the swinging portion 5g of the support 5. In this manner, the support 5 is swingably held on the holder body 3.

In the embodiment, the rear walls 3d of the holder body 3 does not have a base portion. For this reason, the support 5 is easily held by the nipped portion 3f.

As shown in FIG. 11, one pair of rear walls 3d has only the nipped portion 3f without having the base portion 3e. For this reason, members, i.e., the support 5 and the leaf spring 7 can be easily assembled from the holder side, and the number of steps of assembling parts can be considerably reduced.

Since the pair of nipped portions 3f according to the embodiment has relatively large thicknesses, the nipped portions 3f have high rigidity. For this reason, the support 5 can be stably held.

In the first to fifth embodiments, the nipped portions 3f are disposed on the lower sides of the rear walls 3d of the holder body 3. However, the nipped portions 3f may be disposed on the upper sides of the rear walls 3d. In this case, the turning shaft 5f of the support 5 is disposed to turn upward, and the regulating portion 5h is disposed to turn downward. The support 5 swings about the turning shaft 5f on the upper side.

In the first to fifth embodiments, the swinging portion 5g of the support 5 has a rod-like shape. However, the swinging portion 5g has any shape as long as the movement is guided in the advancing and retreating directions along the guide portion 3g of the rear walls 3d.

In the first to fourth embodiments, the rear wall 3d of the holder body 3 has the nipped portion 3f and the base portion 3e, but the base portion 3e may be omitted. Due to the presence of the base portion 3e, the side surfaces 5d of the support 5 are held on the base portions 3e. For this reason, the support 5 can be stably reciprocated.

In the first to fifth embodiments, the side wall 3a surrounding one of the storage spaces 2 has the three supports 5. However, the number of supports 5 may be 1, 2, or 4 or more.

What is claimed is:

1. A cup holder comprising:
  a holder body having a cylindrical side wall surrounding a storage space;
  an opening formed in the side wall of the holder body;
  a support supported on the side wall that advances into and retreats from the storage space through the opening; and
  a biasing member disposed between the support and the side wall and biasing the support in a direction in which the support advances into the storage space, wherein
  the support has a turning shaft serving as a center of swinging of the support, a pair of side surfaces that slide perpendicularly relative to the opening formed in the sidewall of the holder body, and a swinging portion disposed at a predetermined distance from the turning shaft and swinging around the turning shaft by turning of the turning shaft,
  the swinging portion of the support being rod-shaped, protruding from the pair of side surfaces and extending in parallel with the turning shaft,
  the side wall of the holder body has, at positions facing each other through the opening, a rear wall protruding from the side wall to a rear side opposite to the storage space, and
  the rear wall has a nipped portion that swingably holds the support by being nipped between the turning shaft and the swinging portion while the support advances or retreats.

2. The cup holder according to claim 1, wherein the nipped portion has a bearing portion that turnably holds the turning shaft and a guide portion that guides swinging of the swinging portion.

3. The cup holder according to claim 1, wherein the nipped portion has a holding surface that holds a portion facing the rear side of the turning shaft.

4. The cup holder according to claim 2, wherein the nipped portion has a turning shaft guiding portion that guides the turning shaft from the outside of the turning shaft in the radial direction.

5. The cup holder according to claim 2, wherein the nipped portion has a swinging portion guiding portion that guides the swinging portion from the outside of the swinging portion in the radial direction.

6. The cup holder according to claim 1, wherein the biasing member is configured by a cantilevered spring having a fixed end held on the side wall of the holder body and a free end disposed on the outside of the support.

7. The cup holder according to claim 6, wherein the cantilevered spring is configured by an arc-like spring.

8. The cup holder according to claim 6, wherein the cantilevered spring is configured by a leaf spring.

9. The cup holder according to claim 1, wherein the rear wall has a base portion having a protruding portion on the upper side of the nipped portion, and the support has an arc-like groove in which the protruding portion is movably fitted.

10. A cup holder comprising:
a holder body having a cylindrical side wall surrounding a storage space;
an opening formed in the side wall of the holder body;
a support supported on the side wall that advances into and retreats from the storage space through the opening,
a biasing member disposed between the support and the side wall and biasing the support in a direction in which the support advances into the storage space, wherein
the support has a turning shaft serving as a center of swinging of the support, a pair of side surfaces that slide perpendicularly relative to the opening formed in the sidewall of the holder body, and a swinging portion disposed at a predetermined distance from the turning shaft and swinging around the turning shaft by turning of the turning shaft,
the swinging portion of the support being rod-shaped, protruding from the pair of side surfaces and extending in parallel with the turning shaft,
the side wall of the holder body has, at positions facing each other through the opening, a pair of rear walls protruding from the side wall to a rear side opposite to the storage space, and
the rear walls each have a single nipped portion that swingably hold the support by being nipped between the turning shaft and the swinging portion while the support advances or retreats.

* * * * *